(12) United States Patent
Guzman-Casillas et al.

(10) Patent No.: US 7,570,469 B2
(45) Date of Patent: Aug. 4, 2009

(54) DYNAMICALLY CONFIGURABLE RELAY ELEMENT AND RELATED METHODS

(75) Inventors: Armando Guzman-Casillas, Pullman, WA (US); Luther S. Anderson, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 322 days.

(21) Appl. No.: 11/473,432

(22) Filed: Jun. 23, 2006

(65) Prior Publication Data

US 2006/0291120 A1 Dec. 28, 2006

Related U.S. Application Data

(60) Provisional application No. 60/694,068, filed on Jun. 24, 2005.

(51) Int. Cl.
*H02H 3/26* (2006.01)
(52) U.S. Cl. .......................... 361/62; 361/82
(58) Field of Classification Search ............... 361/62, 361/64, 82, 83, 84; 702/58, 64
See application file for complete search history.

(56) References Cited

U.S. PATENT DOCUMENTS

| | | | |
|---|---|---|---|
| 3,946,281 A | 3/1976 | Llona et al. | |
| 4,769,735 A | 9/1988 | Ueda | |
| 5,224,011 A * | 6/1993 | Yalla et al. | 361/93.2 |
| 5,592,393 A * | 1/1997 | Yalla | 700/293 |
| 5,627,716 A | 5/1997 | Lagree et al. | |
| 5,751,532 A | 5/1998 | Kanuchok | |
| 5,856,903 A | 1/1999 | Smith | |
| 5,872,722 A | 2/1999 | Oravetz | |
| 5,987,393 A | 11/1999 | Stinson | |
| 6,005,757 A * | 12/1999 | Shvach et al. | 361/64 |
| 6,055,145 A | 4/2000 | Lagree | |
| 6,239,960 B1 | 5/2001 | Martin | |
| 6,330,141 B1 * | 12/2001 | Elms | 361/93.2 |

OTHER PUBLICATIONS

Horowitz, Phadke and Thorp, Adaptive Transmission System Relaying, IEEE Transactions on Power Delivery, vol. 3, No. 4, Oct. 1988, San Francisco, California.

Thorp, Horowitz and Phadke, The Application of an Adaptive Technology to Power System Protection and Control, Cornell University, Ithaca, New York, 1988.

(Continued)

*Primary Examiner*—Danny Nguyen
(74) *Attorney, Agent, or Firm*—Eugene M. Cummings, P.C.

(57) ABSTRACT

A dynamically configurable relay element configured to protect an electrical system, including a dynamically calculated relay operating quantity, a dynamically calculated relay pickup setting, a dynamically calculated time dial, a plurality of dynamically calculated variables that define a characteristic of the dynamically configurable relay element, and a dynamically calculated operating time, the dynamically calculated operating time based on the dynamically calculated relay operating quantity, the dynamically calculated relay pickup setting, the dynamically calculated time dial and the plurality of dynamically calculated variables. The relay element may be an inverse-time overcurrent element, an instantaneous overcurrent element, an adaptive pickup overcurrent element, and inverse-time overvoltage element, a voltage restrained overcurrent element, and an inverse-time undervoltage element.

40 Claims, 13 Drawing Sheets

OTHER PUBLICATIONS

Glassburn and Sonnemann, Principles of Induction-Type Relay Design, AIEE Transactions, vol. 72, Part III, 1953 (Paper 53-74), New York, New York.

Adkins, Co-ordination of Fuse Links, Electrical World, Mar. 13, 1937, Jersey Central Power & Light Company, Asbury Park, New Jersey.

Sonnemann, A New Inverse Time Overcurrent Relay with Adjustable Characteristics, AIEE Transactions, Jan. 1953, (Paper 53-74), New York, New York.

Schweitzer and Aliaga, Digital Programmable Time-Parameter Relay Offers Versatility and Accuracy, IEEE Transactions on Power Apparatus and Systems, vol. PAS-99, No. 1, Vancouver, British Columbia, Canada, 1980.

Basler Electric, Bel Numerical Systems Time Current Characteristic Curves & Time Dial Calculator, Basler Electric Company, Highland, Illinois. Jun. 2002.

Jampala, Venkata and Damborg, Adaptive Transmission Protection: Concepts and Computational Issues, IEEE Transaction on Power Delivery, vol. 4, No. 1, Jan. 1989, Portland, Oregon.

Sachdev, Chattopadhyah and Sidhu, An Adaptive Relaying Approach to Distribution System Protection, Power System Research Group, Univ. of Saskatchewan, Saskatoon, S.K., Canada, Oct. 19, 1992.

Rockefeller, Wagner and Linders, Adaptive Transmission Relaying Concepts for Improved Performance, IEEE Transactions on Power Delivery, vol. 3, No. 4, Oct. 1988, San Francisco, California.

* cited by examiner

800

PMVO2:=0.5+V1FIM/63−3V2FIM/190.5 # V1-V2
OQ:=LIAFM
PU:=0.5 + V1FIM/63.5
TD:=(0.05<PMVO2<1)*PMVO2+PMVO2>1+(PMVO2<0.05)*0.05
A:=0.14
B:=0
N:=0.2

OQ:=Vnominal-Vinput
PU:=1
TD:=1
A:=0.054
B:=2
N:=0.017

1000

OQ:=VAFM*1000
PU:=1
TD:=1
A:=0.14
B:=0
N:=0.02

OQ:=MAX(IAM,IBM,ICM)
A:=19.61
B:=0.491
N:=2
PU:=3
TD:=0.4 * IN101 + 0.2 * NOT(IN101)

FIG. 12

DYNAMICALLY CONFIGURABLE RELAY ELEMENT AND RELATED METHODS

CROSS-REFERENCE TO RELATED PATENT APPLICATION

This patent application is a non-provisional of prior provisional patent application Ser. No. 60/694,068, filed on Jun. 24, 2005, the right of priority of which is hereby claimed for this patent application.

FIELD OF THE INVENTION

The present invention relates generally to a dynamically configurable relay element for use in an electric power distribution system. The present invention also generally relates to methods for dynamically configuring a relay element.

BACKGROUND OF THE INVENTION

Inverse time-overcurrent elements are a fundamental building block for electric power system protection and have been in service for many years. Inverse time-overcurrent elements are so named because of the amount of time required for the element to assert is inversely proportional to the magnitude of the current applied.

Overcurrent, undervoltage, and overvoltage elements use inverse-time characteristics to provide line, feeder, transformer, and generator protection for power system faults and for abnormal power system operating conditions. For example, relays that include these characteristics have been in service since the early twentieth century.

Older IAC electromechanical relays typically provide one of three specific inverse-time overcurrent characteristics: (1) inverse, (2) very inverse or (3) extremely inverse. FIG. 1 illustrates a prior art electromechanical overcurrent protection relay, generally designated 100, which uses an inverse time-overcurrent characteristic. As shown in FIG. 1, the electromechanical overcurrent protection relay 100 includes a number of components. For example, relay 100 may include a current tap block 102, a time dial 104, an instantaneous unit calibration plate 106, an instantaneous unit pickup adjustment 108, a target (dropped position) 110, an instantaneous unit contact 112, an instrument identification plate 114, a time-overcurrent moving contact 116, a control spring 118, a chassis contact block 120, a latch 122, a cradle 124, an induction disk 126, a damping magnet 128, an operating coil 130, a seal-in contact 132, a target (reset position) 134, a target and seal-in unit 136, target coil taps 138, a time-overcurrent stationary contact 140 and a pickup tap 142.

A user needs to select the appropriate model of the relay in order to obtain the desired inverse, very inverse or extremely inverse characteristic. These relays have two adjustable settings; the time dial (TD) and the Tap. The Tap is sometimes referred to as the Pickup. The inverse-time operating characteristic and the settings, TD and Tap, are selected at the relay setting time, and are not dynamically configurable during operation of the relay.

FIG. 2 illustrates a newer numerical relay, generally designated 200, for example, such a numerical relay is commercially available from Schweitzer Engineering Laboratories, Inc. of Pullman, Wash. under model number SEL-421. A front panel 201 includes a display 202 for showing event, metering, setting and relay self-test status information. Display 202 is controlled by a plurality of navigation pushbuttons 204. The front panel 201 also includes a plurality of programmable status and trip target light emitting diodes (LEDs) 206. A plurality of programmable pushbuttons 208 are also provided on front panel 201.

FIG. 3 illustrates a settings group tool bar menu 300 for the numerical relay 200 shown in FIG. 2. Such numerical relays 200 include an ability to select one of a number (10) of inverse-time operating characteristics. This flexibility avoids the need to specify a particular relay according to the operating characteristic requirements. In addition, there are three settings; the Pickup, the TD and torque control, similar to the electromechanical relay 100 in FIG. 1. In the example of FIG. 3, the overcurrent pickup is defined in field 303, the inverse-time overcurrent curve is defined in field 304, the inverse-time overcurrent time dial is defined in field 305 and the torque control is selected in field 307. Selection of Yes or No in field 306 determines whether the inverse-time overcurrent electromechanical reset is activated. In addition to this option, the user can select the desired operating quantity 308 from a tool bar menu 300, for example, IAL, IA1, IA2, . . . , 312L, 310L. In this example, 310L is selected in field 302. This selectivity optimizes the use of the available overcurrent elements in the numerical relay 200. The overcurrent element reset characteristic can have a fixed delay or emulate the electromechanical relay characteristic. This emulation permits proper coordination with electromechanical relays. The numerical overcurrent relay also includes a torque control equation that emulates the opening or closing of the shading coil in the electromechanical relay.

The additional options in the menu tool bar 300 are good improvements to numerical relays but the basic functionality remains the same as the electromechanical relay counter parts. These numerical inverse-time overcurrent elements have limited adaptability. In an example, the six setting groups can be selected with logic equations while the numerical relay 200 disables itself for a short period of time (longer than one cycle) during settings groups changes. During this time, the numerical relay 200 disables all relay functions including the inverse-time overcurrent element. Thus, the overall relay availability is reduced. This reduction in availability is not desirable.

Another problem with numerical protective relays with overcurrent elements (overcurrent relays) is that they are not dynamically configurable during different power system operating conditions, (e.g., a step-down power transformer is taken out of service via opening associated circuit breakers), current contributions from surrounding power system elements (e.g., feeders) may change thereby rendering the preselected overcurrent settings inadequate when they are utilized as part of a coordination scheme of primary and backup overcurrent relays.

For example, for a typical distribution substation with two parallel power transformers, overcurrent relays are positioned to provide protection for associated feeders as well as to provide backup power transformer protection. Further, the overcurrent relays are coordinated (e.g., a primary and backup overcurrent relay pair) such that there is minimum disruption to the power system when a fault is detected. When one of the power transformers (and its associated overcurrent relay) is taken out of service, overcurrent relays of the transformer that remains in service must be manually (or through setting group changes) re-coordinated to compensate for current contribution changes.

The Institute of Electrical and Electronics Engineers (IEEE) Standard C37.112 [1] provides an Equation (1) to emulate the dynamics of the induction disk of an older inverse-time overcurrent relay:

$$\int_0^{T_0} \frac{1}{t(I)} * dt = 1 \qquad (1)$$

$$\text{where } t(I) = \left(\frac{A}{M^N - 1} + B\right) * TD \text{ for } M > 1 \qquad (2)$$

$$\text{where } M = \frac{I_{Input}}{I_{Pickup}}$$

$$\text{where } t(I) = \left(\frac{t_r}{M^2 - 1}\right) * TD \text{ for } 0 \leq M \leq 1 \qquad (3)$$

and where:

A,B,N—are constants that define the inverse-time relay operating characteristics.

$t_r$—is the reset time for M=0

$T_0$—is the operating time

M—is the relay pickup multiple $I_{Pickup}$—is the relay pickup current setting (threshold)

$I_{Input}$—is the relay input current magnitude

TD—is the relay time dial

FIG. 4 illustrates a diagram which utilizes Equations (1), (2), and (3) to determine the value of outputs 51T and 51R. Block 402 receives the value of M on line 404, and Block 406 receives the value of M on line 404. If M is greater than 1, switch 426 contacts node 424. If M is not greater than 1, switch 426 contacts node 422. Thus in the case that M is greater than 1, Block 412 receives the output of Block 406 on line 408. Further, in the case that M is not greater than 1, Block 412 receives the output of Block 402 on line 410. The result is that when M is greater than one, Equation (2) in Block 406 is used to determine t(I), and when M is not greater than one, Equation (3) in Block 402 is used to determine t(I). Integrator 412 is enabled to begin the integration in accordance with Equation (1). The output 414 of block 412 is received at the non-inverting input of the comparator 416, where it is compared to a reference value of 1 at the inverting input 418. If the output 414 of block 412 exceeds the reference value, comparator 416 will set the 51T output on its output terminal 420 to logical 1. The output 414 of block 412 is also received at the inverting input of the comparator 430, where it is compared to a second reference value of 0 at the non-inverting input 432. If the output 414 of block 412 does not exceed the second reference value at 432, comparator 430 will set the 51R output on its output terminal 434 to logical 1.

Traditionally, given the relay pickup current setting of the inverse-time element, the relay was able to calculate an operating time, where A, B, N, $I_{pickup}$, TD were predetermined values selected at relay setting time. The IEEE and IEC (International Electrotechnical Commission) have defined standard curves by defining the values of A, B, N. Note that once the relay is set, the element has an operating time t(I) where the only variable quantity is the magnitude of the applied current, $I_{Input}$. Table 1 below shows the constants to obtain standard inverse-time characteristics:

TABLE 1

| Characteristic | A | B | N |
|---|---|---|---|
| Moderately Inverse | 0.0515 | 0.1140 | 0.02 |
| Very Inverse | 19.6100 | 0.4910 | 2.00 |
| Extremely Inverse | 28.2000 | 0.1217 | 2.00 |

Equations (1) and (2) have been implemented in many numerical relays using the constants shown in Table 1. In accordance with the present invention, it is desirable to replace the fixed and settable constants A, B, N, $I_{Pickup}$, TD and $I_{Input}$ with variables that are updated dynamically, based on user programmable equations.

A general object of the present invention is to therefore provide a dynamically configurable relay element for use in an electric power distribution system.

Another object of the present invention is to provide methods for dynamically configuring a relay element for use in an electric power distribution system.

SUMMARY OF THE INVENTION

The present invention is directed to a dynamically configurable relay element configured to protect an electrical system, including a dynamically calculated relay operating quantity, a dynamically calculated relay pickup setting, a dynamically calculated time dial, a plurality of dynamically calculated variables that define a characteristic of the dynamically configurable relay element, and a dynamically calculated operating time. The dynamically calculated operating time is based on at least one of the following dynamically calculated quantities: the dynamically calculated relay operating quantity, the dynamically calculated relay pickup setting, the dynamically calculated time dial, and the plurality of dynamically calculated variables.

The dynamically configurable relay element may be selected from a group consisting of an inverse-time overcurrent element, an instantaneous overcurrent element, an adaptive pickup overcurrent element, and inverse-time overvoltage element, a voltage restrained overcurrent element, and an inverse-time undervoltage element. For example, the dynamically calculated relay quantity is OQ, the dynamically calculated relay pickup setting is PU and the dynamically calculated variables may be chosen from the following variables: A, B, N, $t_r$, H, and combinations thereof. The dynamically calculated time dial is TD. The value of N may be used to dynamically calculate the operating time if the ratio of OQ to PU is greater than 1. The value of H may be used to dynamically calculate the operating time if the ratio of OQ to PU is less than or equal to 1. The value of $t_r$ may be used to dynamically calculate the operating time if the ratio of OQ to PU is greater than 1. The dynamically calculated relay operating quantities may be current, voltage, frequency, power, pressure, temperature, impedance, or any other quantity calculated by the relay element. The dynamic calculations may be performed using user programmable equations, which perform Boolean and mathematical operations on the above mentioned variables. Preferably, the relay element operates without interruption while the variables are dynamically updated.

The present invention is also directed to methods of dynamically configuring a relay element to protect an electrical system. The steps of the method include dynamically calculating a relay operating quantity, dynamically calculating a relay pickup setting, dynamically calculating a time dial, dynamically calculating a plurality of variables that define a characteristic of the dynamically configurable relay element, and dynamically calculating an operating time. The dynamically calculated operating time may be based on one or more of the dynamically calculated relay operating quantity; the dynamically calculated relay pickup setting; the dynamically calculated time dial; and the dynamically calculated plurality of variables.

Additional method steps include selecting the dynamically configurable relay element from a group consisting of an inverse-time overcurrent element, an instantaneous overcurrent element, an adaptive pickup overcurrent element, and inverse-time overvoltage element, a voltage restrained overcurrent element, and an inverse-time undervoltage element. For example, the dynamically calculated relay quantity is OQ, the dynamically calculated relay pickup setting is PU and the dynamically calculated variables may be chosen from the following variables: A, B, N, $t_r$, H, and combinations thereof. Further method steps may include dynamically calculating the operating time with the value of N if the ratio of OQ to PU is greater than 1, dynamically calculating the operating time with the value of H if the ratio of OQ to PU is less than or equal to 1, dynamically calculating the operating time with the value of $t_r$ if the ratio of OQ to PU is less than or equal to 1, selecting the dynamically calculated relay operating quantities from the group consisting of current, voltage, frequency, power, pressure, temperature, impedance, or any other quantity calculated by the relay element, using user programmable equations when performing the dynamic calculations, performing Boolean and mathematical operations on the above mentioned variables with the user programmable equations, and dynamically updating the variables without interrupting operation of the relay element.

BRIEF DESCRIPTION OF THE DRAWINGS

The invention, together with its objects and the advantages thereof, may best be understood by reference to the following description taken in conjunction with the accompanying drawings, in which like reference numerals identify like elements in the figures, and in which:

FIG. 8 is a chart which illustrates another embodiment using user programmable equations to emulate a voltage restrained overcurrent element condition in accordance with the present invention.

FIG. 9 is a chart which illustrates using user programmable equations to implement Eskom's inverse-time undervoltage characteristic to avoid voltage system collapse in accordance with the present invention.

Figure 10:
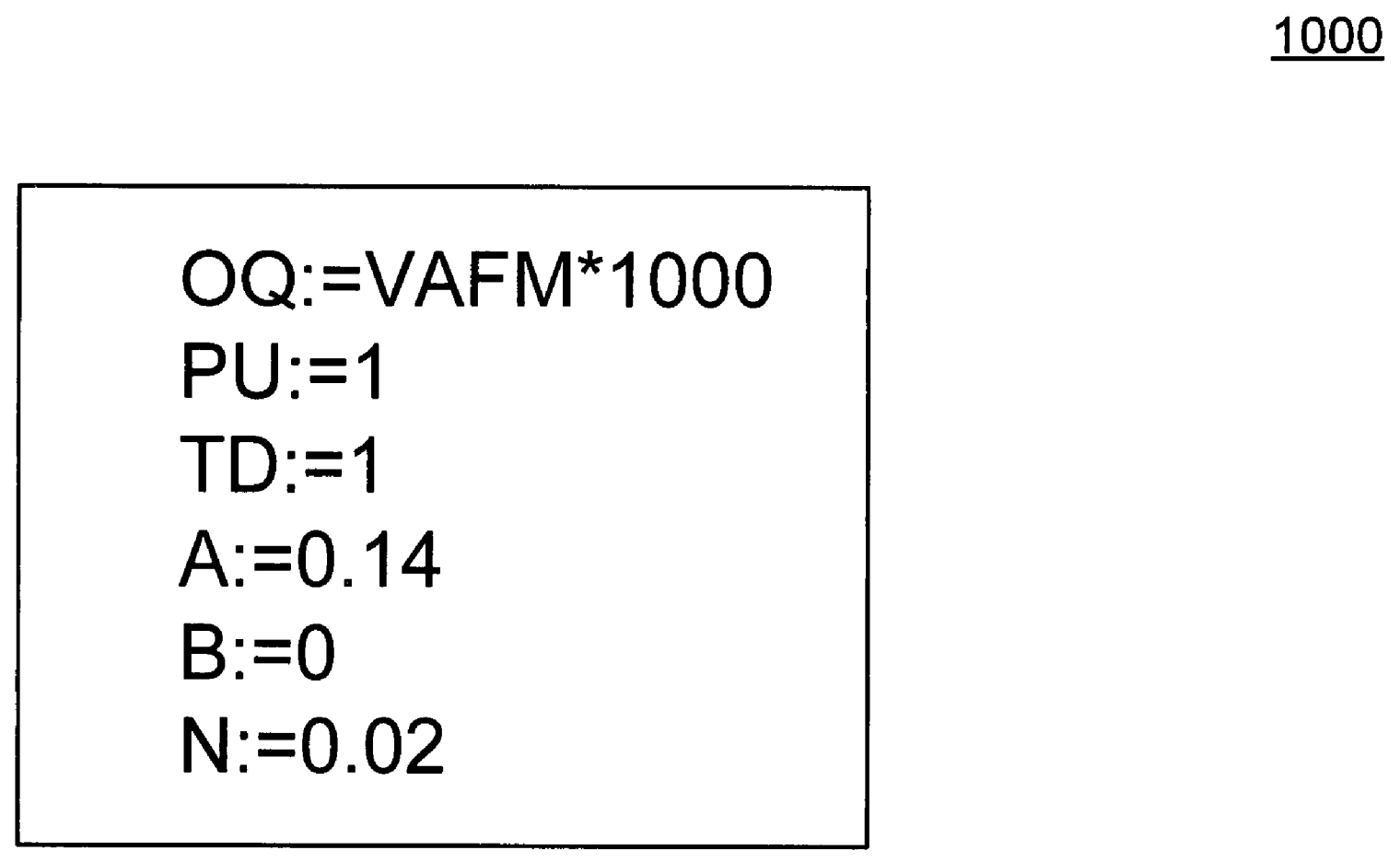

FIG. 10 is a chart which illustrates a modified IEC Class A inverse time overvoltage characteristic in accordance with the present invention.

FIG. 12 is a chart which illustrates transformer parallel coordination in accordance with the present invention.

DESCRIPTION OF THE PREFERRED EMBODIMENTS

It will be understood that the present invention may be embodied in other specific forms without departing from the spirit thereof. The present examples and embodiments, therefore, are to be considered in all respects as illustrative and not restrictive, and the invention is not to be limited to the details presented herein.

According to an embodiment of the invention, the inverse-time element disclosed herein is dynamically configurable such that a (1) relay operating quantity may be dynamically calculated, (2) the relay pickup setting may be dynamically calculated, (3) the time dial may be dynamically calculated, (4) the A, B, N, $t_r$, and H quantities may be dynamically calculated and (5) the values for relay operating quantity, the relay pickup setting, the time dial and the A, B, N, $t_r$, and H quantities are used to dynamically calculate the relay operating time.

In existing relays TD, A, B, N, $t_r$, H, and the operating quantity are fixed once the relay is set, and the operating time, t, is solely a function of the applied current t(I) for a given set of settings. The new inverse time element Equations (4) and (5) utilize t as a function of all parameters to replace Equations (2) and (3):

$$t(OQ) = \left(\frac{A}{\left(\frac{OQ}{PU}\right)^N - 1} + B\right) \cdot TD \quad \text{for } \frac{OQ}{PU} > 1 \quad (4)$$

$$t(OQ) = \left[\frac{t_r}{\left(\frac{OQ}{PU}\right)^H - 1}\right] \cdot TD \quad \text{for } 0 \leq \frac{OQ}{PU} \leq 1 \quad (5)$$

Where:

$t_r$ is the reset time at $$\frac{OQ}{PU} = 0$$

(typical $t_r$ value 21.6 for very inverse time characteristic)

OQ, is the operating quantity, replacing $I_{Input}$

TD is the Time dial

A, B, N, $t_r$, and H are variables (a typical value of H is 2)

PU is the Pickup, replacing $I_{Pickup}$

Equation (4) calculates the operating time t(OQ) when $$\frac{OQ}{PU} > 1,$$

Equation (5) calculates the resetting time $t_r$, when $$0 \leq \frac{OQ}{PU} \leq 1.$$

In addition to the

Figure 1:
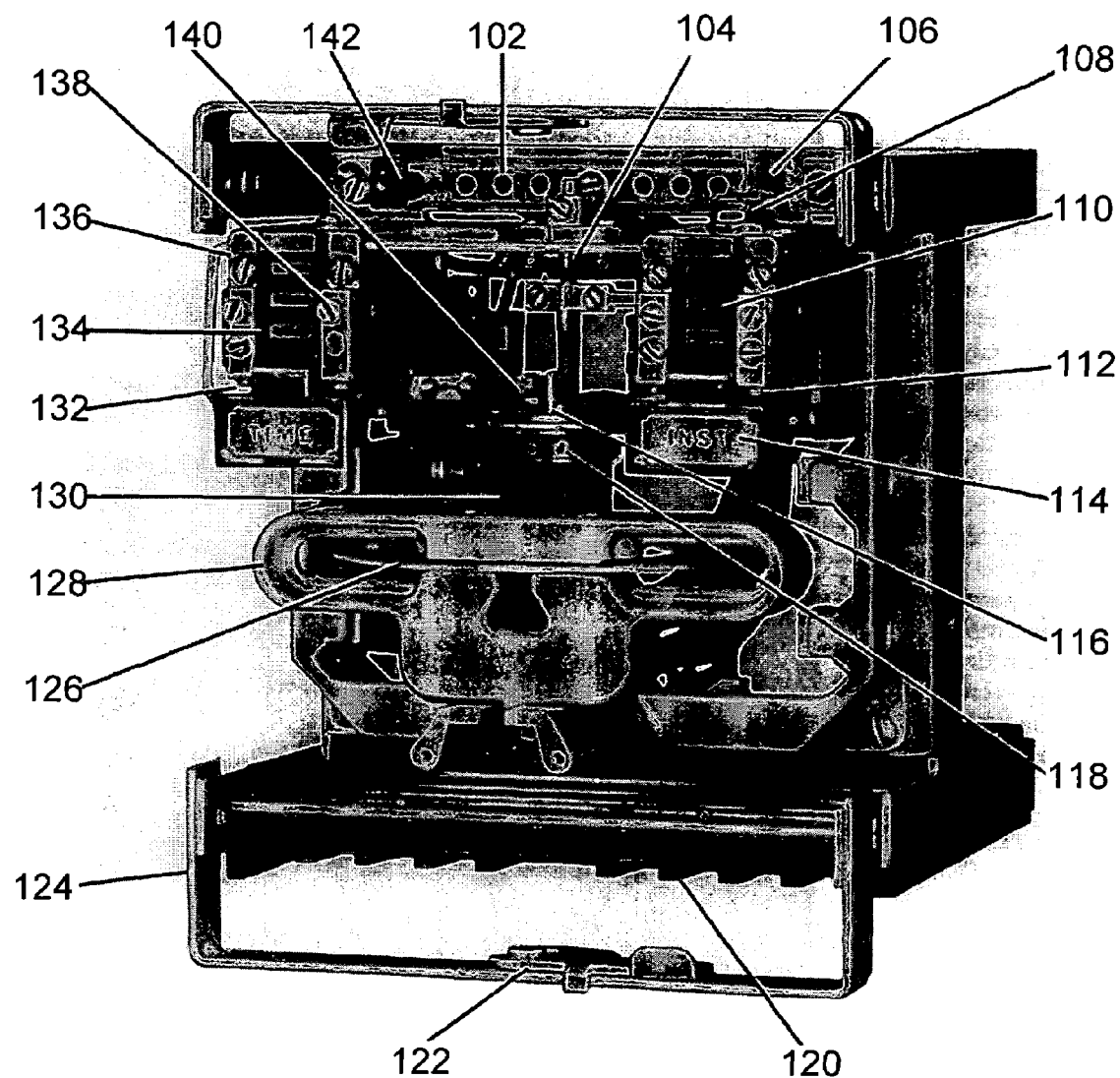
FIG. 1 is a perspective view illustrating a prior art electromechanical relay with an overcurrent protection function.
Figure 2:
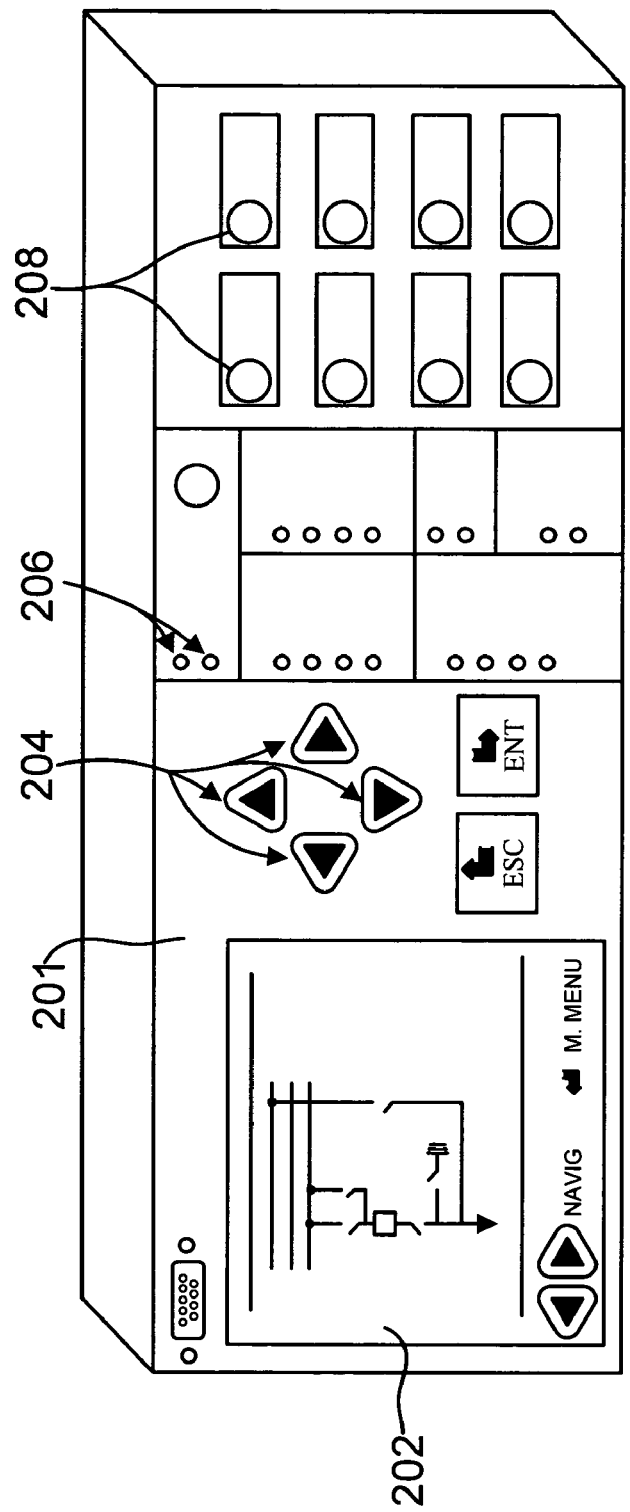
FIG. 2 is a perspective view illustrating a prior art numerical relay with an overcurrent protection function.
Figure 3:
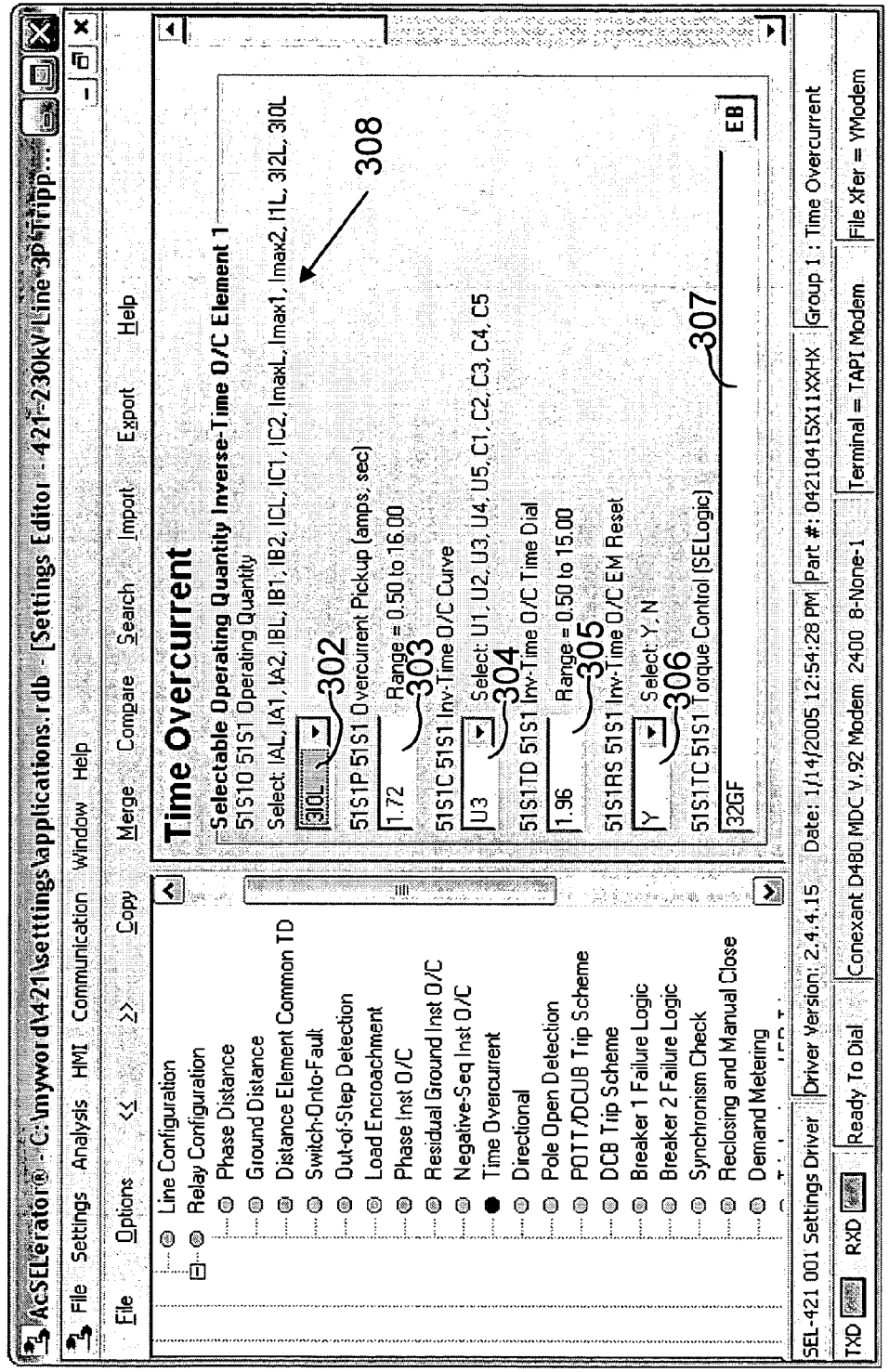
FIG. 3 is a prior art tool bar menu illustrating a settings group for the numerical relay shown in FIG. 2.
Figure 4:
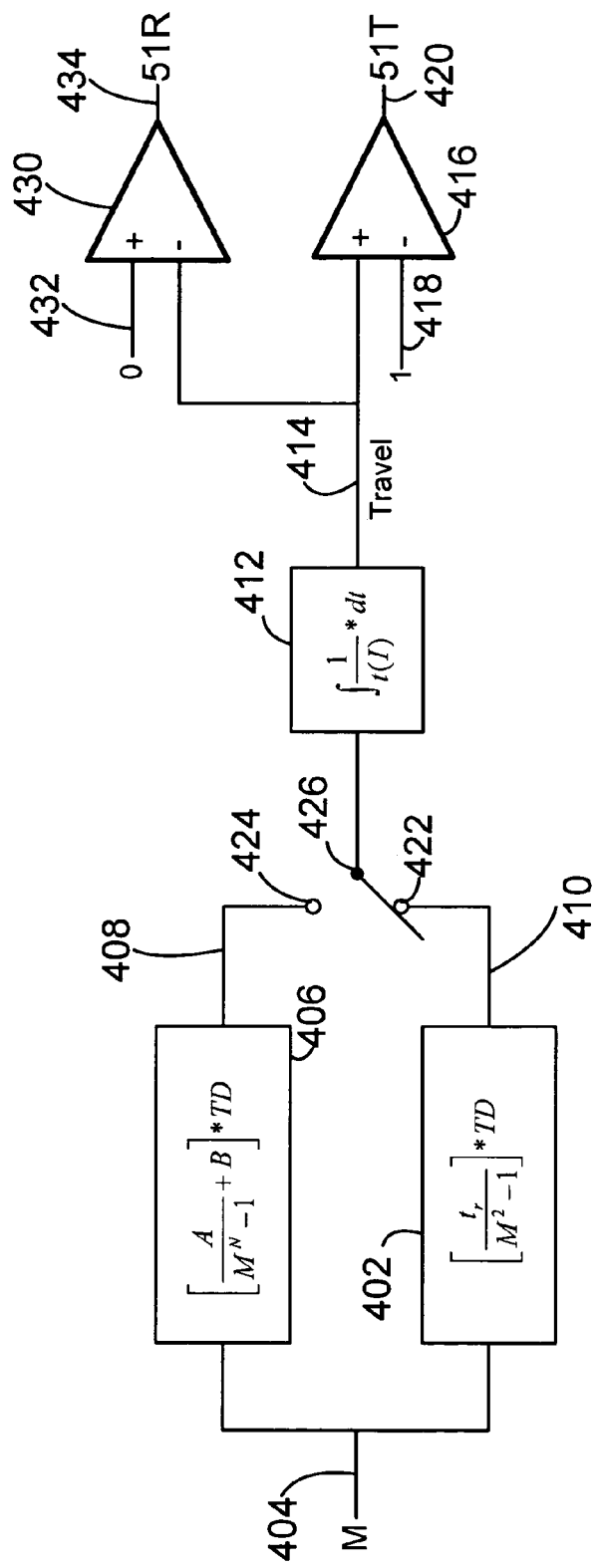
FIG. 4 is a diagram illustrating a prior art implementation of an adaptive-pickup overcurrent element for the numerical relay shown in FIG. 2 for the M>1 and the O≦M≦1 conditions.

Boolean outputs of existing time-overcurrent elements (pickup, reset, and trip), the new element also outputs a numerical value representing the percent of the total operating time or percent of travel as shown in FIG. 4.

Percent travel is equal to travel multiplied by 100.

Figure 11A:
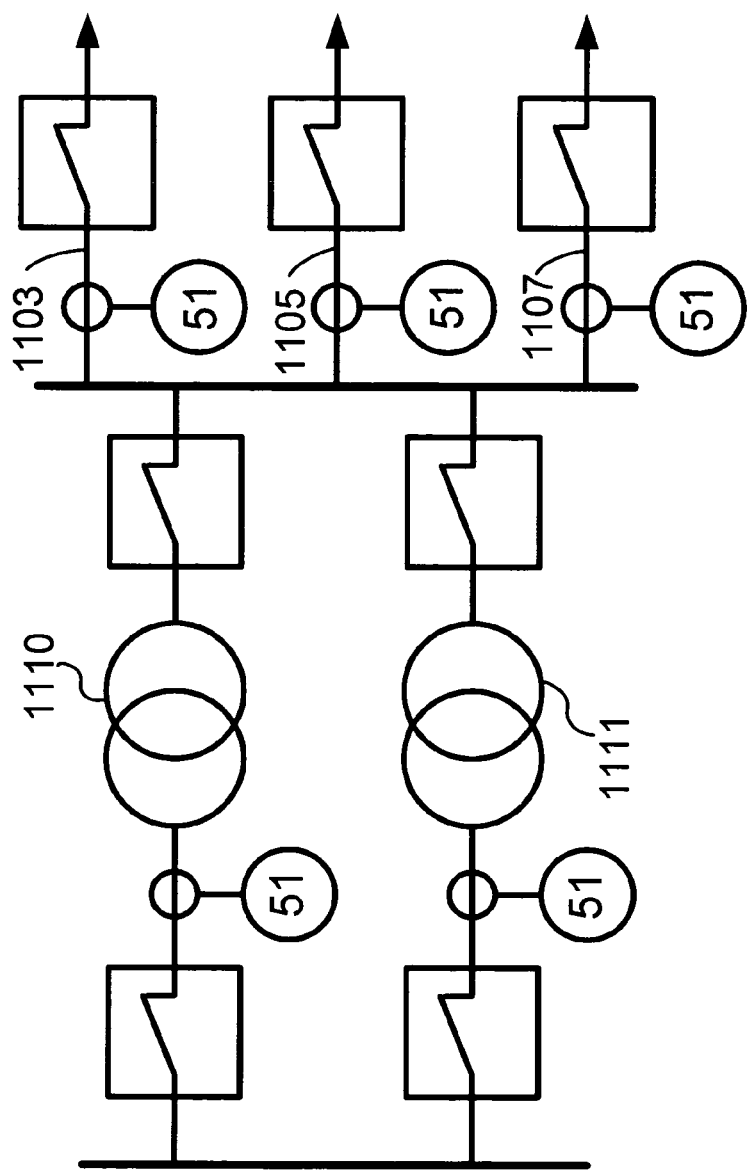
FIG. 11A is a diagram illustrating the overcurrent protection for a typical distribution substation with two transformers in parallel in accordance with the present invention.
Figure 11B:
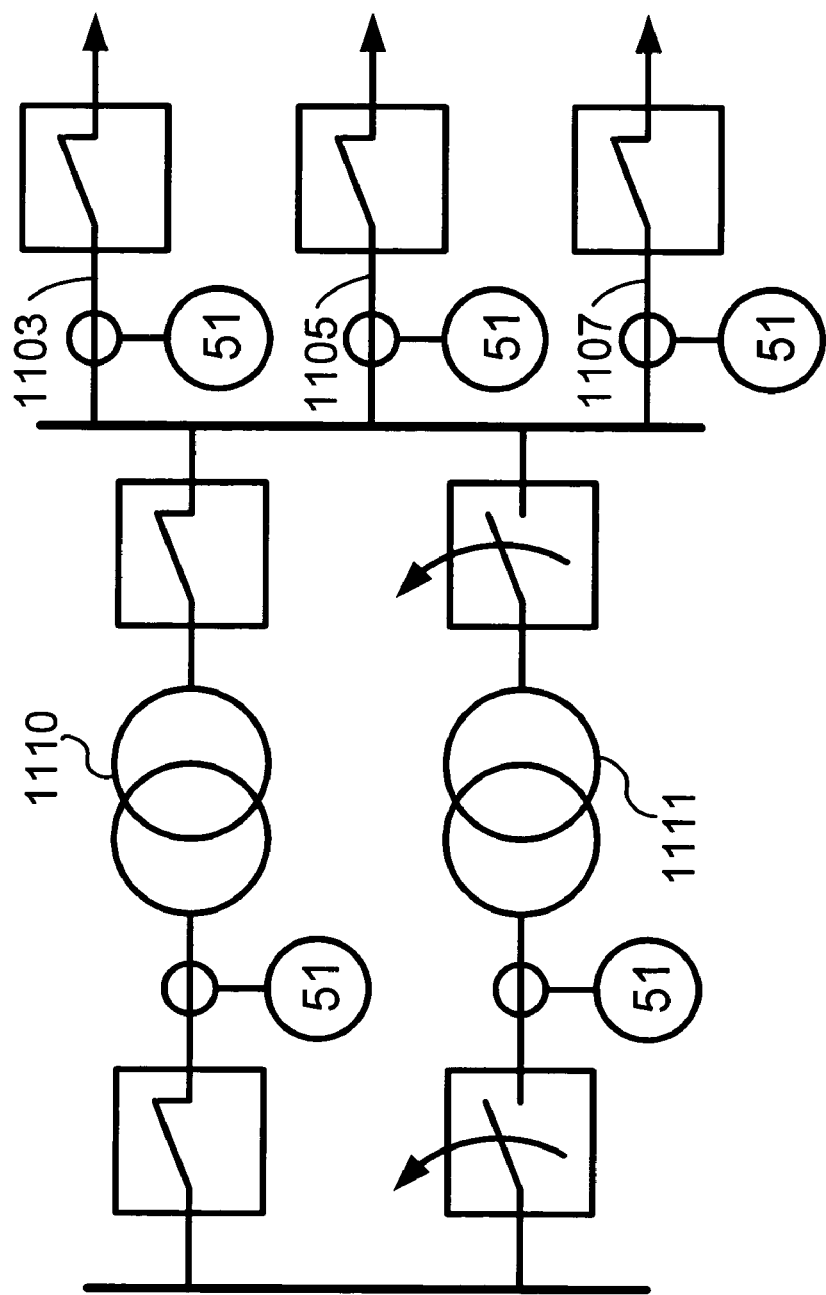
FIG. 11B is a diagram illustrating a transformer-feeder transformers is out-of-service in accordance with the present invention.

There are applications which require different characteristics and different operating quantities. Some of these applications include:

Adaptive-pickup overcurrent (see FIG. 5)
Inverse-time overvoltage (see FIGS. 6 and 7)
Voltage-restrained overcurrent (see FIG. 8)
Special inverse-time undervoltage (see FIG. 9)
Special inverse-time overvoltage (see FIG. 10)
Adaptive coordination in parallel transformer applications (see FIGS. 11A and 11B)

In an embodiment, the numerical relay implements this adaptability using user programmable equations in a multifunction numerical protective relay. With the user programmable equations of the present invention, one can program a relay with an adaptive inverse-time overcurrent characteristic.

As explained above, FIG. 4 illustrates a diagram with an implementation of an overcurrent element in a numerical relay for the M>1 condition.

According to Equation (2) an adaptive behavior can be obtained using Equation (6) instead.

$$t(I) = \left( \frac{3.88}{\left( \frac{I_{Input}}{I_{Demand} + 0.5} \right)^2 - 1} + 0.0963 \right) \cdot 0.5 \quad (6)$$

In Equation (6), the overcurrent element pickup $I_{Pickup}$ is a function of the demand current, $I_{Demand}$. The pickup value will be small for light load conditions but increases as the load increases. This approach provides adequate sensitivity for different load conditions.

Figure 5:
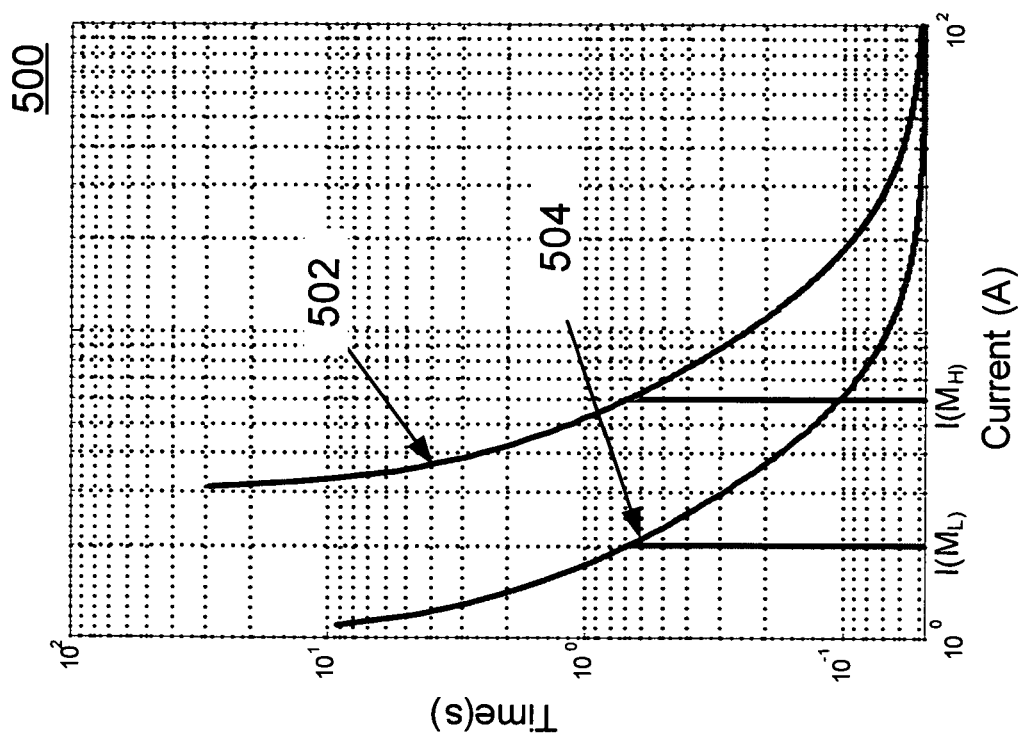
FIG. 5 is a graph of current versus time illustrating an embodiment of the operating characteristics of the load adaptive pickup overcurrent element in accordance with the present invention.

FIG. 5 is a graph, generally designated 500, which depicts an embodiment of the invention under the operating characteristics of the load adaptive pickup overcurrent element using Equation (6) under heavy load 502 and under light load 504 conditions. With this adaptive characteristic, the inverse-time element pickup depends on the feeder demand current. The element is more sensitive for light-load conditions than for heavy-load conditions.

Applying dynamically configurable relay element method, the pickup, PU, is a function of the demand current $I_{Demand}$ (assigned as variable Idem). The Inverse Time Element (ITE) operating quantity, pickup PU, time-dial TD, and the A, B, N settings are:

OQ:=Iinput
PU:=Idem+0.5 #(Idem is the demand current)
TD:→0.5
A:=3.88
B:=0.0963
N:=2

Figure 6:
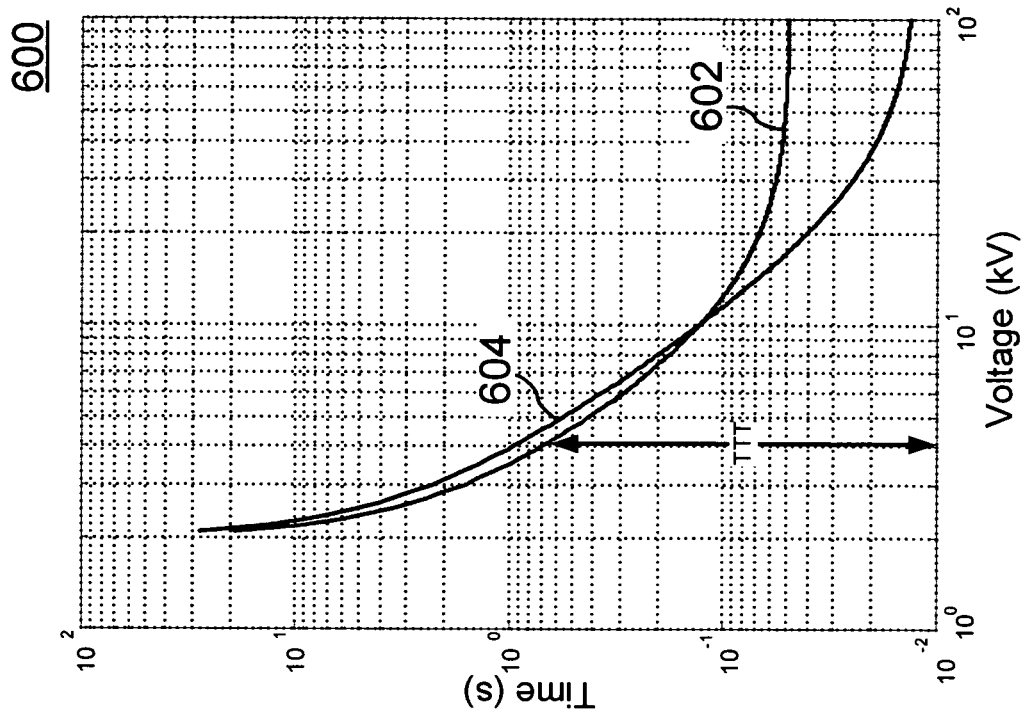
FIG. 6 is a graph of voltage versus time illustrating an embodiment of the operating characteristics of the inverse time overvoltage element in accordance with the present invention.

FIG. 6 is a graph, generally designated 600, which depicts an embodiment of the invention under the operating characteristics of the inverse time overvoltage element. Using user programmable equations, inverse time overvoltage elements with a specific characteristic can be created. FIG. 6 shows a very inverse characteristic 602 and an extremely inverse characteristic 604 of an overvoltage element according to Equation (7). The time to trip, TTT, depends on the A, B, and N settings, and on the applied voltage. A=3.88 and B =0.0963 are the values for the very inverse characteristic 602, and A=5.64 and B=0.02434 are the values for the extremely inverse characteristic 604. Changing or varying these values generates different characteristics.

$$t(V) = \left( \frac{A}{\left( \frac{V_{Input}}{V_{Pickup}} \right)^2 - 1} + B \right) \cdot 0.5 \quad (7)$$

Figure 7:
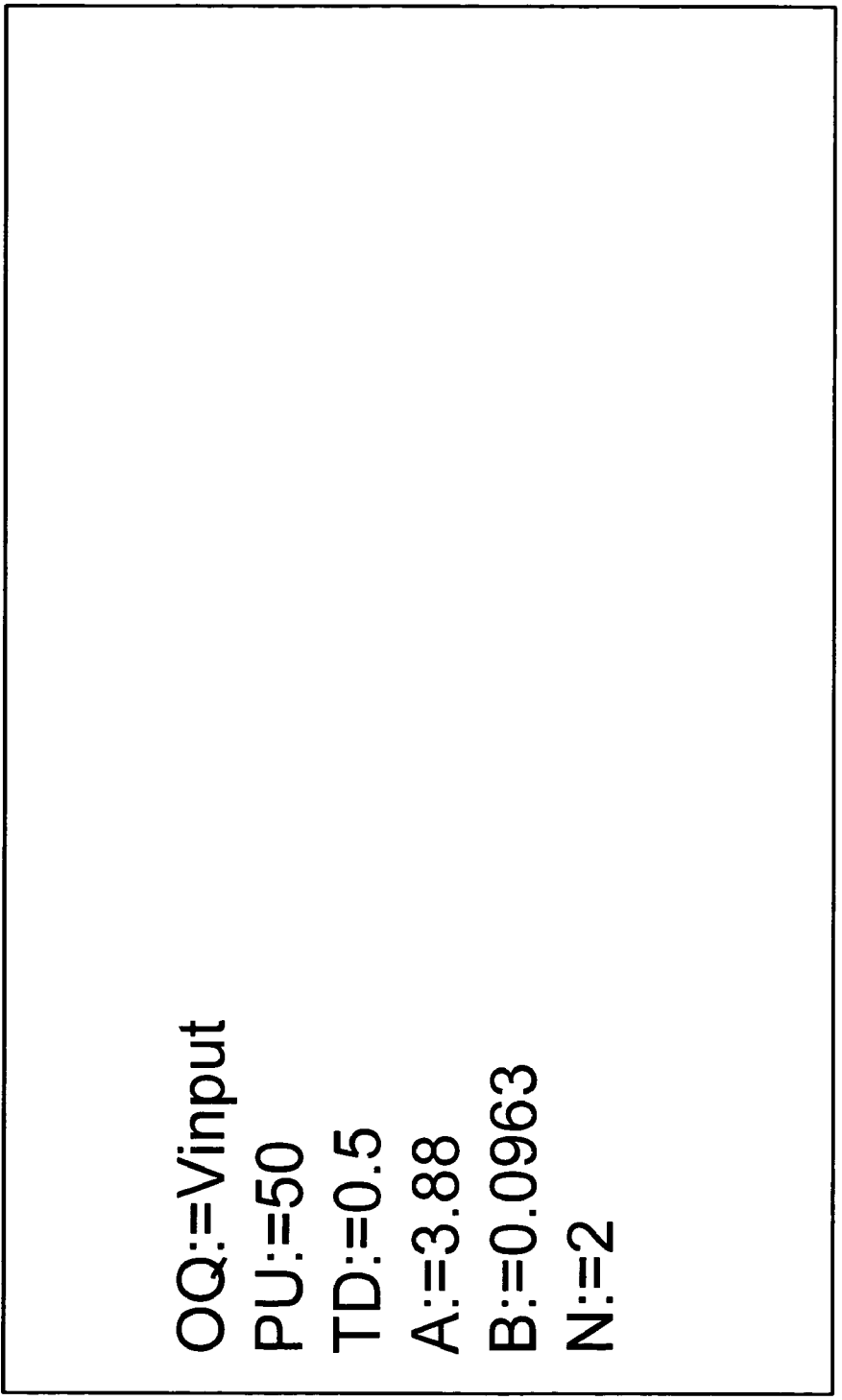
FIG. 7 is a chart which illustrates an example using user programmable equations to emulate a very-inverse time overvoltage element characteristic in accordance with the present invention.

FIG. 7 is a chart, generally designated 700, which illustrates an example using user programmable equations to emulate a very Inverse time overvoltage element characteristic 602 depicted in FIG. 6. Applying dynamically configurable relay element method to the traditional inverse-time overvoltage element, the ITE operating quantity, pickup, time-dial, the A, B, and N settings are:

OQ:=Vinput
PU:=50
TD:=0.5
A:=3.88
B:=0.0963
N:=2

FIG. 8 is a chart, generally designated 800, which illustrates an example using user programmable equations to emulate a voltage restrained overcurrent element condition. The voltage-restrained overcurrent was developed to replace existing old relays that were in service. The requirement was to add positive-sequence and negative-sequence voltages to control the relay pickup and time-dial according to Equation (8).

$$t(I) = \left( \frac{0.14}{\left( \frac{|I_A|}{|V_1|} \right)^{0.02} - 1} \right) \cdot (V_1 - V_2) \quad (8)$$

Applying dynamically configurable relay element method to the user programmable equations, the multiple of pickup, M, is a function of the apparent impedance:

$$\frac{|I_A|}{|V_1|},$$

and the time dial is a function of the difference between the positive-sequence voltage and the negative-sequence voltage. The ITE operating quantity, pickup, time-dial, A, B, and N settings are:

PMV02:=0.5+V1FIM/63−3V2FIM/190.5 #V1-V2
OQ:=LIAFM
PU:=0.5+V1FIM/63.5
TD:=(0.05<PMV02<1)*PMV02+PMV02>1+
 (PMV02<0.05)*0.05
A:=0.14

B:=0
N:=0.2

V1FIM is the positive sequence full cycle instantaneous voltage magnitude and V2FIM is the negative sequence full cycle instantaneous voltage magnitude.

FIG. 9 is a chart, generally designated 900, which illustrates another example using user programmable equations to implement Eskom's inverse-time undervoltage characteristic to avoid voltage system collapse characterized by Equation (9):

$$t(V) = \left(\frac{0.054}{(V_{Nominal} - V_{Input})^{0.017} - 1}\right) + 2 \quad (9)$$

Applying dynamically configurable relay element methods to the user programmable equations, the multiple of pickup M, is a function of the difference between the nominal voltage $V_{Nominal}$ and the input voltage $V_{Input}$. The ITE operating quantity OQ, pickup PU, time-dial TD, and the A, B, and N settings are:

OQ:=Vnominal−Vinput
PU:=1
TD:=1
A:=0.054
B:=2
N:=0.017

FIG. 10 is a chart, generally designated 1000, which illustrates a modified IEC Class A inverse time overvoltage characteristic. Equation (10) implements the traditional IEC inverse-time overvoltage element. FIG. 10 illustrates the user programmable equation to implement the desired inverse-time overvoltage characteristic.

$$t(V) = \left(\frac{0.14}{\left(\frac{V_{Input}}{0.001}\right)^{0.02} - 1}\right) \cdot TD \quad (10)$$

In this application the ITE operating quantity OQ, pickup PU, time-dial TD, and the A, B, and N settings are:

OQ:=VAFM*1000 #(A phase full cycle voltage magnitude)
PU:=1
TD:=1
A:=0.14
B:=0
N:=0.02

FIG. 11A is a diagram, generally designated 1100, which illustrates the overcurrent protection for a typical distribution substation with two transformers 1110 and 1111 in parallel. Transformer and feeder overcurrent protection must have proper time coordination for all operating conditions. In FIG. 11A, the overcurrent elements 51, located at the transformer location 1110 and 1111 provide backup transformer protection. These overcurrent elements 51 must coordinate with the overcurrent elements 51 located at a plurality of feeders 1103, 1105 and 1107.

FIG. 11B is a diagram, generally designated 1150. When one of the transformers such as 1111 is out-of-service the coordination is affected. Overcurrent element adaptability is desired for optimum coordination for all operating conditions. A typical solution to optimize coordination is to use different settings groups. Each setting group has the best overcurrent relay settings for the corresponding operating condition.

FIG. 12 is a chart, generally designated 1300, which illustrates parallel transformer coordination. In this application the time dial is a function of how many transformers are in service. When only transformer 1110 (or 1111) is in service, IN101 asserts and TD=0.4. When both transformers 1110 and 1111 are in service, IN101 deasserts and TD=0.2. Applying dynamically configurable relay element methods to the user programmable equations, the ITE operating quantity OQ, pickup PU, time-dial TD, A, B, and N settings are:

OQ:=MAX(IAM,IBM,ICM) #(Maximum of phase current magnitudes)
A:=19.61
B:=0.491
N:=2
PU:=3
TD:=0.4*IN101+0.2*NOT(IN101)

Figure 13:
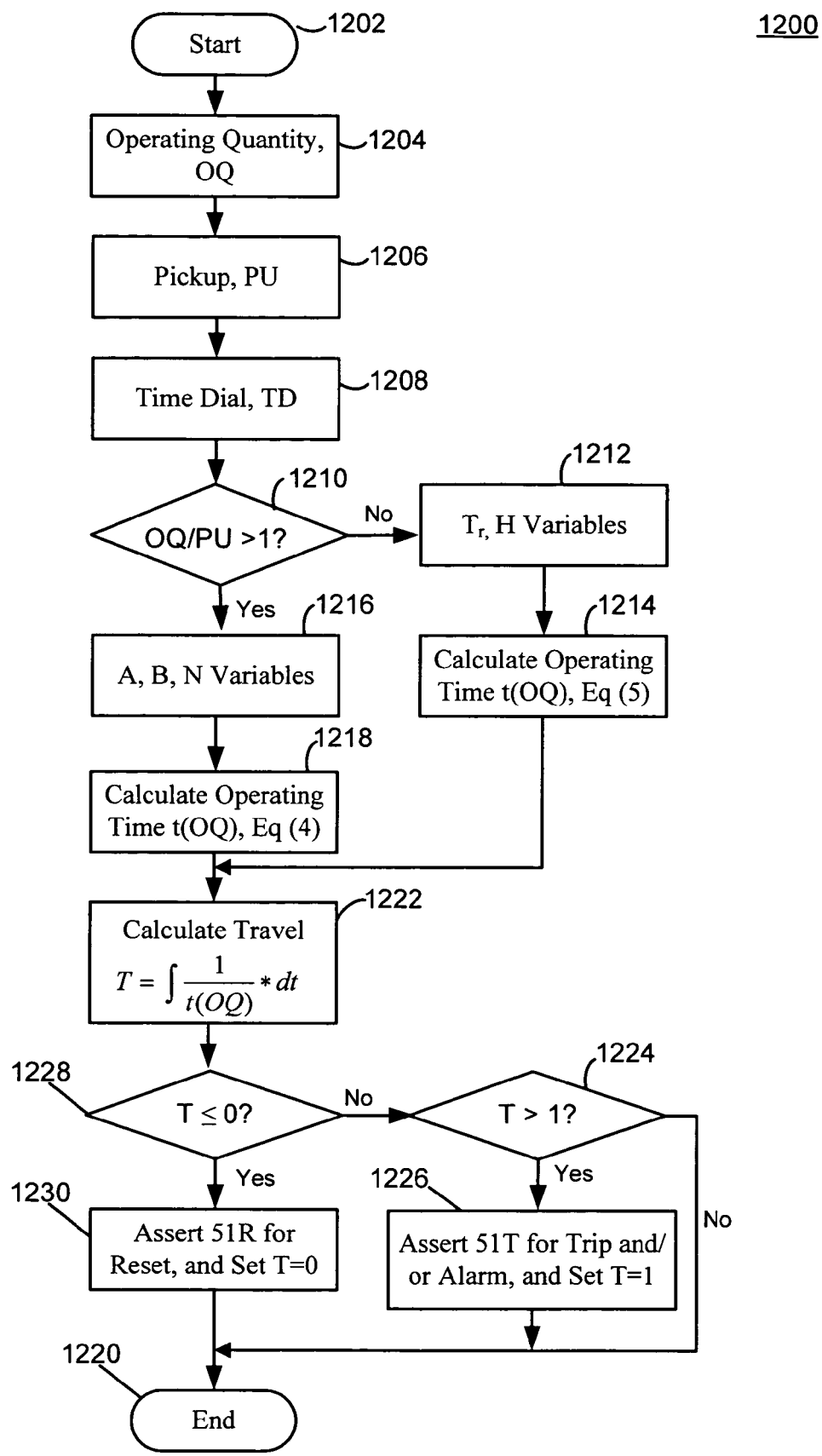
FIG. 13 is a flow chart illustrating an embodiment of a dynamically configurable inverse-time element calculation sequence in accordance with the present invention.

FIG. 13 is a flow chart, generally designated 1200, which depicts an embodiment of a dynamically configurable inverse-time element calculation sequence. The operating time, t, is a function of all the above variables, t(OQ,TD,A,B,N,PU,H,$t_r$) by combining Equations (4) and (5) into (1), to yield the inverse-time element equation described. The processing interval may be at fixed intervals of time (e.g. 4.16 ms). Further, the processing interval may be at a multiple of the power system operating frequency (e.g. ¼ of a cycle).

$$\int_0^{T_0} \frac{1}{\left[\frac{A}{\left(\frac{OQ}{PU}\right)^N - 1} + B\right] * TD} * dt = 1 \quad \text{for } \frac{OQ}{PU} > 1 \quad (11)$$

$$\int_0^{T_0} \frac{1}{\left[\frac{t_r}{\left(\frac{OQ}{PU}\right)^H - 1}\right] * TD} * dt = 1 \quad \text{for } 0 \leq \frac{OQ}{PU} \leq 1 \quad (12)$$

Following the flow chart 1200, the relay operating quantity OQ in Equations (11) and (12) may be dynamically calculated/selected from relay measured values at block 1204, whether the value is current, voltage, frequency, power, pressure, temperature, impedance, or any other analog quantity calculated by the relay. Alternatively, the relay operating quantity OQ may be selected or calculated from measured voltage inputs, or may be selected or calculated using a nominal voltage $V_{Nominal}$ and a measured input voltage $V_{Input}$, for example. Similarly, the relay pickup setting PU may be dynamically calculated at block 1206 based on, for example, the measured current plus a fixed quantity, the time dial setting TD dynamically calculated at block 1208 based on weighted sets of conditions and the variables that define a characteristic of the dynamically configurable relay element A, B and N settings may be dynamically calculated at block 1216. The operating time t (OQ) may then be calculated with Equation (4) at block 1218. If OQ/PU was not greater than 1 at block 1210, the value of variables H and $t_r$ is determined at block 1212 and the operating time t(OQ) is determined at block 1214 in accordance with Equation (5). Travel (T) is then calculated at block 1222. If T is less than or equal to 0 at block 1228, then 51R is asserted to Reset at block 1230, and the process ends at block 1220. If T is not less than or equal to 0 at block 1228, then T is compared with 1 in block 1224. If T is greater than 1 at block 1224, then 51T is asserted to cause an alarm or trip at block 1226, and the process ends at block 1220. If T is not greater than 1 at block 1224, then the process ends at block 1220.

All of the above quantities can be locally measured or remotely measured and received through a communication link. As a result, the dynamically configurable relay is suitable for multiple applications and provides adaptability without sacrificing availability. Preferably, the relay operates without interruption while the variables are being dynamically updated.

While particular embodiments of the invention have been shown and described, it will be obvious to those skilled in the art that changes and modifications may be made therein without departing from the invention in its broader aspects.

The invention claimed is:

1. A dynamically configurable relay element configured to protect an electrical system, the dynamically configurable relay element comprising:
    a dynamically calculated relay operating quantity;
    a dynamically calculated relay pickup setting;
    a dynamically calculated time dial;
    a plurality of dynamically calculated variables that define a characteristic of the dynamically configurable relay element; and
    a dynamically calculated operating time.

2. A dynamically configurable relay element in accordance with claim 1, wherein the dynamically calculated operating time is based on one selected from the group consisting of the dynamically calculated relay operating quantity, the dynamically calculated relay pickup setting, the dynamically calculated time dial, the plurality of dynamically calculated variables, and combinations thereof.

3. A dynamically configurable relay element in accordance with claim 1, said dynamically configurable relay element selected from a group consisting of an inverse-time overcurrent element, an instantaneous overcurrent element, an adaptive pickup overcurrent element, and inverse-time overvoltage element, a voltage restrained overcurrent element, and an inverse-time undervoltage element.

4. A dynamically configurable relay element in accordance with claim 1, wherein the dynamically calculated relay quantity is OQ, the dynamically calculated relay pickup setting is PU and the dynamically calculated variables are selected from the group consisting of: A, B, N $t_r$, H, and combinations thereof.

5. A dynamically configurable relay element in accordance with claim 4, wherein the value of N is used to dynamically calculate the operating time if the ratio of OQ to PU is greater than 1.

6. A dynamically configurable relay element in accordance with claim 4, wherein the value of H is used to dynamically calculate the operating time if the ratio of OQ to PU is less than or equal to 1.

7. A dynamically configurable relay element in accordance with claim 4, wherein the value of $t_r$ is used to dynamically calculate the operating time if the ratio of OQ to PU is less than or equal to 1.

8. A dynamically configurable relay element in accordance with claim 1, wherein the dynamically calculated relay operating quantities are current, voltage, frequency, power, pressure, temperature, impedance, and combinations thereof.

9. A dynamically configurable relay element in accordance with claim 1, wherein the dynamically calculated relay operating quantities are locally measured.

10. A dynamically configurable relay element in accordance with claim 1, wherein the dynamically calculated relay operating quantities are remotely measured.

11. A dynamically configurable relay element in accordance with claim 1, wherein the dynamic calculations are performed using user programmable equations.

12. A dynamically configurable relay element in accordance with claim 11, wherein the user programmable equations perform Boolean and mathematical operations on the variables.

13. A dynamically configurable relay element in accordance with claim 1, wherein the relay element operates without interruption while the variables are dynamically updated.

14. A dynamically configurable relay element in accordance with claim 1, wherein an output of the relay element comprises a numerical value representing one selected from the group consisting of a percent of a total operating time and a percent of travel.

15. A dynamically configurable relay element in accordance with claim 1, further comprising a processing interval fixed at an interval of time.

16. A dynamically configurable relay element in accordance with claim 1, further comprising a processing interval at a multiple of a power system operating frequency.

17. A method of dynamically configuring a relay element to protect an electrical system, said method comprising the steps of:
    dynamically calculating a relay operating quantity in a numerical relay;
    dynamically calculating a relay pickup setting in the numerical relay;
    dynamically calculating a time dial in the numerical relay;
    dynamically calculating a plurality of variables in the numerical relay that define a characteristic of the dynamically configurable relay element; and
    dynamically calculating an operating time in the numerical relay.

18. The method of dynamically configuring the relay element in accordance with claim 17, wherein the dynamically calculated operating time is based on one selected from the group consisting of the dynamically calculated relay operating quantity, the dynamically calculated relay pickup setting, the dynamically calculated time dial, the plurality of dynamically calculated variables, and combinations thereof.

19. The method of dynamically configuring the relay element in accordance with claim 17, said method comprising the additional step of:
    selecting the dynamically configurable relay element from a group consisting of an inverse-time overcurrent element, an instantaneous overcurrent element, an adaptive pickup overcurrent element, and inverse-time overvoltage element, a voltage restrained overcurrent element, and an inverse-time undervoltage element.

20. The method of dynamically configuring the relay element in accordance with claim 17, wherein the dynamically calculated relay quantity is OQ, the dynamically calculated relay pickup setting is PU and the dynamically calculated variables are selected from the group consisting of: A, B, N, $t_r$, H, and combinations thereof.

21. The method of dynamically configuring the relay element in accordance with claim 20, said method comprising the additional step of:
    dynamically calculating the operating time with the value of N if the ratio of OQ to PU is greater than 1.

22. The method of dynamically configuring the relay element in accordance with claim 20, said method comprising the additional step of:
    dynamically calculating the operating time with the value of H if the ratio of OQ to PU is less than or equal to 1.

23. The method of dynamically configuring the relay element in accordance with claim 20, said method comprising the additional step of:
dynamically calculating the operating time with the value of $t_r$ if the ratio of OQ to PU is less than or equal to 1.

24. The method of dynamically configuring the relay element in accordance with claim 17, said method comprising the step of:
selecting the dynamically calculated relay operating quantities from the group consisting of current, voltage, frequency, power, pressure, temperature, impedance, and combinations thereof.

25. The method of dynamically configuring the relay element in accordance with claim 17, said method comprising the step of:
measuring the operating quantity locally.

26. The method of dynamically configuring the relay element in accordance with claim 17, said method comprising the step of:
measuring the operating quantity remotely.

27. The method of dynamically configuring the relay element in accordance with claim 17, said method comprising the additional step of: using user programmable equations when performing the dynamic calculations.

28. The method of dynamically configuring the relay element in accordance with claim 27, said method comprising the additional step of:
performing Boolean and mathematical operations on the variables with the user programmable equations.

29. The method of dynamically configuring the relay element in accordance with claim 17, said method comprising the additional step of: dynamically updating the variables without interrupting operation of the relay element.

30. The method of dynamically configuring the relay element in accordance with claim 17, said method comprising the additional step of:
outputting a numerical value representing one selected from the group consisting of a percent of a total operating time or a percent of travel.

31. The method of dynamically configuring the relay element in accordance with claim 17, wherein a processing interval of the method is a fixed interval of time.

32. The method of dynamically configuring the relay element in accordance with claim 17, wherein a processing interval of the method is a multiple of a power system operating frequency.

33. A dynamically configurable relay element to protect an electrical system, the dynamically configurable relay element comprising:
a calculated relay operating quantity;
a calculated relay pickup setting;
a calculated time dial;
a plurality of dynamically calculated variables that define a characteristic of the dynamically configurable relay element; and
a calculated operating time.

34. The dynamically configurable relay element of claim 33, wherein the relay operating quantity comprises a dynamically calculated relay operating quantity.

35. The dynamically configurable relay element of claim 33, wherein the time dial comprises a dynamically calculated time dial.

36. A method of dynamically configuring a relay element to protect an electrical system, said method comprising the steps of:
calculating a relay operating quantity;
calculating a relay pickup setting;
calculating a time dial;
dynamically calculating a plurality of variables that define a characteristic of the dynamically configurable relay element; and,
calculating an operating time.

37. The method of claim 36, wherein the step of calculating a relay operating quantity comprises dynamically calculating a relay operating quantity.

38. The method of claim 36, wherein the step of calculating a time dial comprises dynamically calculating a time dial.

39. A dynamically configurable relay element configured to protect an electrical system, the dynamically configurable relay element comprising:
a dynamically calculated relay operating quantity;
a dynamically calculated relay pickup setting;
a dynamically calculated time dial;
a plurality of dynamically calculated variables that define a characteristic of the dynamically configurable relay element; and
a dynamically calculated operating time calculated using a selected one of the plurality of dynamically calculated variables, selected based on a ratio of the dynamically calculated relay operating quantity to the dynamically calculated relay pickup setting.

40. A dynamically configurable relay element configured to protect an electrical system, the dynamically configurable relay element comprising:
a calculated relay operating quantity;
a calculated relay pickup setting;
a calculated time dial;
a plurality of dynamically calculated variables that define a characteristic of the dynamically configurable relay element; and
a dynamically calculated operating time calculated using a selected one of the plurality of dynamically calculated variables, selected based on a ratio of the calculated relay operating quantity to the calculated relay pickup setting.

* * * * *

UNITED STATES PATENT AND TRADEMARK OFFICE
CERTIFICATE OF CORRECTION

PATENT NO. : 7,570,469 B2  Page 1 of 1
APPLICATION NO. : 11/473432
DATED : August 4, 2009
INVENTOR(S) : Guzman-Casillas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 364 days.

Signed and Sealed this

Seventh Day of September, 2010

David J. Kappos
*Director of the United States Patent and Trademark Office*